US012776230B2

(12) United States Patent
Igel et al.

(10) Patent No.: US 12,776,230 B2
(45) Date of Patent: Oct. 27, 2026

(54) PERSONAL PROTECTIVE EQUIPMENT COMPRISING AN INFORMATION DISPLAY AREA

(71) Applicant: SKYLOTEC GmbH, Neuwied (DE)

(72) Inventors: Oliver Igel, Lahnstein (DE); Eike Stern, Utzerath (DE); Peter Fust, Niederbieber (DE)

(73) Assignee: SKYLOTEC GmbH, Neuwied (DE)

( * ) Notice: Subject to any disclaimer, the term of this patent is extended or adjusted under 35 U.S.C. 154(b) by 601 days.

(21) Appl. No.: 18/339,579

(22) Filed: Jun. 22, 2023

(65) Prior Publication Data

US 2023/0419866 A1 Dec. 28, 2023

(30) Foreign Application Priority Data

Jun. 23, 2022 (DE) ..................... 10 2022 115 707.5

(51) Int. Cl.

*G09F 3/20* (2006.01)
*A62B 35/00* (2006.01)
*G09F 3/02* (2006.01)

(52) U.S. Cl.

CPC ................ *G09F 3/20* (2013.01); *A62B 35/00* (2013.01); *G09F 3/02* (2013.01); *G09F 3/0288* (2013.01); *G09F 2003/0266* (2013.01)

(58) Field of Classification Search

CPC . G09F 3/20; G09F 3/02; G09F 3/0288; G09F 2003/0266; A62B 35/00
USPC ............ 414/815; 182/5, 10, 11, 71, 72, 231, 182/233, 234, 235, 238; 40/1.5, 1.6, 5, 40/446, 493, 494, 495
See application file for complete search history.

(56) References Cited

U.S. PATENT DOCUMENTS

| | | | | |
|---|---|---|---|---|
| 745,010 A * | 11/1903 | Guett | H01H 9/16 40/495 |
| 2006/0005293 A1 | 1/2006 | Frey et al. | |
| 2010/0226748 A1* | 9/2010 | Wolner | A62B 35/0093 414/815 |

FOREIGN PATENT DOCUMENTS

| | | |
|---|---|---|
| AU | 2008201650 A1 | 10/2008 |
| CA | 2573356 A1 | 2/2006 |
| CN | 207663672 U | 7/2018 |
| CN | 114618094 A | 6/2022 |
| DE | 202007012803 U1 | 2/2009 |

(Continued)

OTHER PUBLICATIONS

Canadian Office Action for corresponding Application No. 3,204,376, dated Jan. 29, 2025, 6 pages.

(Continued)

*Primary Examiner* — Justin V Lewis
(74) *Attorney, Agent, or Firm* — Dority & Manning, P.A.

(57) ABSTRACT

Personal protective equipment includes an information display area, wherein the information display area comprises an information carrier for displaying information of a first application and a second application of the personal protective equipment, wherein the information display area in a first of at least two states exclusively displays information relating to the first application and in a second state exclusively displays information relating to the second application, and wherein the display of the information display area is switchable back and forth between the at least two states a plurality of times. Furthermore, the invention relates to a method for changing a state of an information display area of a personal protective equipment.

7 Claims, 3 Drawing Sheets

(56) References Cited

FOREIGN PATENT DOCUMENTS

| | | | |
|---|---|---|---|
| DE | 202016104396 | U1 | 11/2017 |
| JP | 2017093515 | A | 6/2017 |
| KR | 200461735 | Y1 | 8/2012 |
| KR | 20200133875 | A | 12/2020 |
| WO | WO 2007/061651 | A1 | 5/2007 |

OTHER PUBLICATIONS

Australian Office Action for corresponding Application No. 2023203895, dated Apr. 29, 2025, 6 pages.

Extended European Search Report (with English translation) received in corresponding Application No. EP 23179404.1, dated Nov. 27, 2023, 20 pages.

Office Action (with English translation) received in corresponding Application No. DE 102022115707.5, dated Mar. 16, 2023.

* cited by examiner

PERSONAL PROTECTIVE EQUIPMENT COMPRISING AN INFORMATION DISPLAY AREA

CROSS-REFERENCE TO RELATED APPLICATIONS

The present application is based upon and claims the right of priority to German Patent Application Number 10 2022 115 707.5, filed Jun. 23, 2022, the disclosure of which is hereby incorporated by reference herein in its entirety for all purposes.

TECHNICAL FIELD

The invention relates to personal protective equipment comprising an information display area. Furthermore, the invention relates to a method for changing a state of an information display area of a personal protective equipment.

BACKGROUND OF THE INVENTION

In order to carry out work in places which are difficult to access, for example at great heights, rope access techniques can be used in which a worker, also known as a rope access technician, abseils down to the work site. Rope access technicians are usually employed when it is either too expensive or too inconvenient to erect a crane or scaffolding in order to achieve access to the work site. For example, rope access technicians clean windows on high-rise buildings or perform assembly, maintenance and repair work on wind turbines.

As a rule, rope access technicians are redundantly secured during the work and abseil down to the work site primarily by use of standardized special equipment. They then abseil down from the work site to the ground or ascend again on the rope, depending on local conditions.

Personal protective equipment, such as retractable-type fall arresters, is used for safety purposes. A retractable-type fall arrester is an expandable connection means equipped with an automatic blocking function.

Due to certification and safety requirements, the personal protective equipment must comply with a wide range of specifications, for example, the retractable-type fall arrester must remain blocked after blocking until it is unloaded. This prevents a further fall.

Personal protective equipment can also be used in different ways, which can be problematic from the point of view of the user's safety, as illustrated herein by the example of the retractable-type fall arrester: In a vertical application, the retractable-type fall arrester is mounted in such a way that the connector of the retractable-type fall arrester is not stressed over edge during use. For example, the retractable-type fall arrester is mounted on a ceiling, wherein the space directly below the mounting location of the retractable-type fall arrester is freely accessible.

In a horizontal application, the retractable-type fall arrester is mounted such that the connector of the retractable-type fall arrester is stressed over edge when in use. For example, the retractable-type fall arrester is mounted at a floor so that the space directly below the mounting location of the retractable-type fall arrester is not freely accessible. Accordingly, in the horizontal use, the connector then first extends parallel to the floor until it reaches an edge and then extends downward substantially vertically from there. In other words, the connector is thus stressed over the edge during horizontal use. If there is a risk of edge stress on the connector when using the retractable-type fall arrester, the retractable-type fall arrester must be appropriately tested for this application and approved for this use.

The certification requirements also stipulate that the weight with which the certification and safety tests were performed must be indicated on the retractable-type fall arrester. However, in the case of retractable-type fall arresters that are certified for both vertical and horizontal use, and where certification has been performed with different weights, this leads to a situation that two different weights are indicated on the retractable-type fall arrester, which can be confusing for the user of the retractable-type fall arrester. This increases the risk that the user will use the retractable-type fall arrester in unauthorized situations—for example, with too much weight—such that the safety of the user cannot be guaranteed.

Thus, there is a need to improve the safety of the user of personal protective equipment.

DESCRIPTION OF THE INVENTION

Based on this situation, it is an object of the present invention to provide means to improve the safety of the user of personal protective equipment and, in particular, to reduce the risk that the personal protective equipment is used in situations not certified for it.

The object is achieved by the features of the independent claims. Advantageous embodiments are provided in the subclaims.

Accordingly, the object is achieved by a personal protective equipment comprising an information display area, wherein the information display area comprises an information carrier for displaying information of a first application and a second application of the personal protective equipment, the information display area in a first of at least two states exclusively displays information relating to the first application and in a second state exclusively displays information relating to the second application, and the display of the information display area is switchable between the at least two states a plurality of times.

An aspect of the invention is that the personal protective equipment does not simultaneously display information relating to the first application, for example in the case of retractable-type fall arresters the vertical application, and information relating to the second application, for example in the case of retractable-type fall arresters the horizontal application. Instead, the information display area comprises at least two states and is designed in such a way that the information relating to the first application is only visible to the user at times when the information relating to the second application is not visible and vice versa. This prevents the user from incorrectly assigning the information relating to the first application and that relating to the second application and, for example, from loading the retractable-type fall arrester with a weight that is not permitted for the corresponding application.

Another aspect is that the information display area is designed in such a way that it is possible to switch back and forth between the at least two states a plurality of times. Thus, depending on the planned specific application in advance of the application of the personal protective equipment the information display area can be set to the state that corresponds to the planned specific application. If, for example, it is planned to use the retractable-type fall arrester vertically, the information display area can be set prior to use to the state in which only information relating to vertical use is visible to the user via the information carrier. If, on the other hand, it is planned to use the retractable-type fall arrester horizontally, the information display area can be set prior to use to the state in which only information relating to the horizontal use is visible to the user via the information carrier. In particular, it is possible to switch back and forth between the at least two states a plurality of times, so that the personal protective equipment is not fixed for only one application, but can be used several times for different applications—for example vertical application and horizontal application. This enables that the user only has to purchase one piece of personal protective equipment, and, moreover, the information display area also ensures increased safety for the user.

"Personal protective equipment", PPE, is understood exclusively in the context of the invention in accordance with Regulation (EU) 2016/425 of the European Parliament and of the Council of 9 Mar. 2016 on personal protective equipment:

a) Equipment designed and manufactured to be worn or held by a person as protection against one or more risks to his or her health or safety,
b) interchangeable components for equipment referred to in point a) that are essential to its protective function; and
c) connection systems for equipment referred to in point a) which are not held or carried by a person and which are designed to connect that equipment to an external device or a secure anchor point and which are not designed to be permanently fixed and do not require fixing operations before use.

Preferably, the information relating to the first application comprises information relating to a first case of application of the personal protective equipment, for example the application in a first geographical area, or the application at a first predetermined external load. Preferably, the information relating to the second application comprises information relating to a second case of application of the personal protective equipment different from the first case of application, for example the application in a second geographical area, or the application at a second predetermined external load.

Further preferably, the information relating to the first application comprises information relating to the first application to be applied to the personal protective equipment due to regulatory requirements. Further preferably, the information relating to the second application comprises information relating to the second application to be applied to the personal protective equipment due to regulatory requirements.

Further preferably, the information relating to the first application comprises information relating to a horizontal application and further preferably information relating to a maximum weight load for horizontal application. Further preferably, the information relating to the second application comprises information relating to a vertical application and preferably information relating to a maximum weight load for vertical application.

In the vertical application, the personal protective equipment is mounted such that a connector of the personal protective equipment is not stressed over edge during use. For example, the retractable-type fall arrester is mounted on a ceiling, wherein the space directly below the mounting location of the retractable-type fall arrester is freely accessible.

In the horizontal application, the personal protective equipment is mounted such that the connector of the personal protective equipment is stressed over edge in use. For example, the retractable-type fall arrester is attached to a floor so that the space directly below the mounting location of the retractable-type fall arrester is not freely accessible. In the horizontal use, the connector first extends parallel to the floor until it reaches an edge and then extends downward substantially vertically from there.

According to a preferred further development of the invention, it is provided that the personal protective equipment is designed as a retractable-type fall arrester, as a harness, as a safety helmet, as a connector, as a descending or rescue device, as a fall arrest device, as a carabiner, as a rescue means, as a power ascender and/or as a load securing system. Depending on the design of the personal protective equipment, the first and second applications also differ.

Preferably, the retractable-type fall arrester is a retractable-type fall arrester that complies with the EN360:2002 standard. Retractable-type fall arresters are used as a component of personal protective equipment against falls from a height (PPEgA). They usually serve as a connector between a safety harness and an anchor point. If a fall occurs during work at height, a brake is preferably activated by a centrifugal mechanism which reliably arrest the fall. In other words, the retractable-type fall arrester is preferably a fall arrester with a blocking function. Preferably, the retractable-type fall arrester is designed in such a way that it catches the user within 2 meters in the event of a fall and the force exerted in this case does not exceed 6 kN. The retractable-type fall arrester therefore allows the user to move freely within a radius of action during work at height and, in the event of a fall, the forces acting on the body are reduced by braking and damping systems. The retractable-type fall arrester also preferably allows the connector to be adjusted in such a way that a fall path is kept short even in changing working positions in the case of a fall.

The retractable-type fall arrester is preferably certified as a first application for horizontal use and as a second application for vertical use. Preferably, the retractable-type fall arrester is designed such that a maximum user weight for the vertical use is 140 kg and a maximum user weight for the horizontal use is 100 kg. Furthermore, the retractable-type fall arrester is preferably also designed in such a way that it is approved for horizontal use without an additional band fall damper.

Preferably, the retractable-type fall arrester comprises a connector, which may be in the form of a rope, a steel cable, a strap and/or a webbing. Further preferably, the retractable-type fall arrester comprises a housing, a carabiner, a pulley, a rope hoist, an pull-in damper, a rope brake, and/or an stop device. Preferably, the connector is protected during retraction by the pulley integrated in the housing of the retractable-type fall arrester. This protects both the housing of the retractable-type fall arrester and the connector itself from wear. In addition, the energy-absorbing pull-in damper prevents the carabiner from hitting the housing without braking when the rope is retracted.

The housing of the retractable-type fall arrester is preferably UV-impermeable, made of plastic and/or aluminum. For the purpose of robustness of the retractable-type fall arrester, the connector of the retractable-type fall arrester is preferably protected from UV radiation by the housing. Furthermore, plastic and/or aluminum materials have the advantage that the housing is light and robust.

Further preferably, the retractable-type fall arrester may include one or more fall indicators. The fall indicator—for example, color symbols—preferably indicates whether the retractable-type fall arrester is still functional or needs to be checked, for example, because a fall has previously occurred. The fall indicator can be arranged at a carabiner or at the housing of the retractable-type fall arrester. For example, the condition of a brake of the retractable-type fall arrester may be assessed in this manner without having to open the housing of the retractable-type fall arrester.

As mentioned above, one aspect is that the information display area comprises the information carrier and is configured such that it is possible to switch back and forth between the at least two states a plurality of times. In this context, according to a preferred further development of the invention, it is provided that the information carrier is a non-electronic information carrier, and/or that the information carrier is configured as a non-electronic display, and/or that the display of the information display area is configured such that it is possible to switch between the two states without supplying electrical energy. In other words, the personal protective equipment is thus preferably designed in such a way that a change of state does not take place by supplying electrical energy. Instead, the personal protective equipment is preferably designed in such a way that the state can be changed by supplying mechanical energy. Thus, the information carrier has a long service life and is not dependent on an electrical energy storage. The personal protective equipment is thus preferably free of an electrical energy storage. Further preferably, the information carrier is designed to permanently display the information relating to the first application and/or the information relating to the second application. Particularly preferably, the information is applied to the information carrier by means of printing processes, engraving processes, embossing processes and/or laser inscription.

According to a further preferred further development of the invention, it is provided that the information carrier provides on its front side information relating to the first application, preferably the vertical application, and on its rear side information relating to the second application, preferably the horizontal application, and/or that it is possible to switch back and forth between the at least two states a plurality of times by a rotary movement of the information carrier about an axis of rotation which lies in a plane of the information carrier. The provision of the information on the front side and the rear side of the preferably non-transparent information carrier represents a simply realizable possibility that in the first state of the information display area exclusively information relating to the first application is visible and in the second state exclusively information relating to the second application is visible. Particularly preferably, the information carrier is designed as a plate. The multiple change between the two states is achieved by rotating the information carrier in such a way that after the rotational movement respectively the other side of the information carrier is visible to the user.

In order to easily enable a multiple change of state by rotation, the information carrier in the information display area of the personal protective equipment is preferably detachably connected to a housing or a surface of the personal protective equipment. For example, the information carrier may be detachably connected to the housing or surface via a mechanical connection or via magnetic interaction. In this context, according to another preferred further development of the invention, it is provided that the information carrier in the information display area is detachably connected to the housing or the surface of the personal protective equipment by means of a clamp connection, or that the information carrier in the information display area is detachably connected to the housing or the surface of the personal protective equipment by means of a screw connection.

In the case of the clamp connection, the information carrier is thus preferably connected to the housing or the surface of the personal protective equipment in a force-fitting and/or form-fitting manner, wherein it is further preferably provided that the information carrier comprises clamping lugs engaging in recesses in the housing or the surface. In the case of the screw connection, a screw and a corresponding screw hole in the information carrier and/or a corresponding recess and/or depression for receiving the screw in the housing or the surface preferably ensure the connection of the information carrier to the housing or the surface.

Alternatively to the detachable connection of the information carrier to the housing or the surface, it can be provided that the information carrier in the information display area of the personal protective equipment is not detachably but movably connected to the housing or the surface of the personal protective equipment—for example via a joint and preferably via a swivel joint. In this context, according to a preferred further development of the invention, it is provided that the information carrier in the information display area is connected to the housing or the surface of the personal protective equipment by means of a hinge connection.

It is particularly preferred that the information carrier is designed as a plate which is detachably connected to the housing by means of a clamp connection in the information display area. By releasing the clamp connection, the plate can be removed from the housing and can be clamped to the housing again in an inverted form, thus enabling a simple change of the state of the information display area.

According to another preferred further development of the invention, it is further provided that the information carrier has a mirror-symmetrical shape, that the information carrier comprises clamping lugs for clamping the information carrier to the housing or the surface of the personal protective equipment, and/or that the information carrier comprises a recess for receiving a screw connection. The mirror-symmetrical shape of the information carrier with respect to a mirror plane perpendicular to the plane of the information carrier enables the information carrier to be connected to the housing or the surface of the personal protective equipment without any problems, even when rotated.

With respect to the clamping connection, the clamping lugs are particularly preferably arranged mirror-symmetrically. It is further preferably provided that the housing or the surface of the personal protective equipment in the information display area comprises recesses for the clamping lugs of the information carrier, i.e. preferably recesses corresponding to the clamping lugs.

As an alternative to the design of the information carrier in such a way that the information carrier provides information relating to the first application on its front side and information relating to the second application on its rear side, according to a preferred further development of the invention it is provided that the information carrier provides information relating to the first application, preferably information relating to the vertical application, and information relating to the second application, preferably information relating to the horizontal application, on its front side and the personal protective equipment comprises a cover comprising a viewing window for the information carrier in the information display region. In this way it can be enabled in a simple way by the cover and the viewing window that in the first state of the information display area exclusively information relating to the first application is visible through the viewing window and in the second state exclusively information relating to the second application is visible through the viewing window. The respective other information is accordingly covered by the cover and is thus not visible at the same time. The cover is preferably connected to the housing or the surface of the personal protective equipment. Preferably, the information carrier is arranged between the housing and the cover comprising the viewing window. The cover may also comprise more than one viewing window.

With respect to the change of the state, according to another preferred further development of the invention, it is provided that it is possible to switch back and forth a plurality of times between the at least two states by a rotational movement of the information carrier about an axis of rotation which extends perpendicular to a plane of the information carrier, or by an axial movement of the information carrier along an axis which extends in a plane of the information carrier, and/or that it is possible to change between the at least two states by a rotational movement or an axial movement of the cover comprising the viewing window. Thus, in this alternative, a multiple change of state can preferably be performed by a rotational movement or by an axial displacement of the information carrier relative to the cover.

In order to make the change of state easy, the information carrier in the information display area of the personal protective equipment is preferably connected to the housing or surface in such a way that the information carrier can be moved relative to the cover. Thus, by means of the relative movement of the cover with respect to the information carrier, the state of the information display area can be changed in a simple manner. According to a preferred further development of the invention, it is also provided that the information carrier in the information display area is axially displaceable or mounted rotatable relative to the viewing window of the cover. In other words, the change can also take place via a rotary movement or alternatively via a translational movement.

With respect to the rotational movement, it is particularly preferably provided that the information carrier is designed as a disc rotatably mounted relative to the viewing window. Further preferably, the information carrier is rotatably mounted at the housing or the surface via a screw connection in such a way that the information carrier is partially covered by the cover comprising the viewing window. Thus, the information carrier, which is designed as a disc, can be rotated simply by turning the screw. In this context, it is further provided according to a preferred further development of the invention that the viewing window (or the plurality of viewing windows of the cover) and the information carrier are configured in such a way that either the information relating to the first application or the information relating to the second application is visible through the viewing window or the plurality of viewing windows. In other words, the size and shape of the viewing window correspond to the size and shape of the information displayed on the information carrier. It is further preferably provided that the housing has a recess and/or depression for receiving the screw connection.

As an alternative to the possibility of moving the information carrier to change the state, it is also possible to move the cover comprising the viewing window. For example, during the change, the viewing window can remain unchanged with respect to the cover and move along with the cover, i.e. rotate along with it or move axially. Thus, a different area of the information carrier proportionally covered by the cover is visible through the viewing window, respectively. Alternatively, the viewing window can change relative to the cover during change. For example, a sliding solution can be provided in which a part of the cover can be moved along an axis via a guide rail. In this case, the viewing window is initially located on one side of the movable part of the cover, which steadily decreases in size as the cover is moved until it is no longer present. In addition, on the other side of the cover, a viewing window newly created by moving the movable part of the cover enlarges until it reaches the size of the original viewing window.

Further technical effects and advantages of the personal protective equipment will be apparent to the person skilled in the art from the description of the method for changing a state of the information display area of the personal protective equipment, as well as from the description relating to the exemplary embodiments and the figures.

Furthermore, the invention relates to a method for changing a state of an information display area of a personal protective equipment, wherein the personal protective equipment comprises the information display area, the information display area comprises an information carrier for displaying information of a first application and a second application of the personal protective equipment, the information display area in a first of at least two states exclusively displays information relating to the first application and in the second state exclusively displays information relating to the second application, and the display of the information display area is switchable back and forth between the at least two states a plurality of times, comprising the steps of:

providing the personal protective equipment comprising the information display area in the first or second of the at least two states, changing the state of the information display area by rotating or axially displacing the information carrier, or changing the state of the information display area by rotating or axially displacing a cover comprising an information carrier viewing window.

One aspect of the invention is that the state of the information display area can be changed by rotating or axially displacing the information carrier or the information carrier cover comprising a viewing window. Thus, if in the first step the personal protective equipment, such as for example the retractable-type fall arrester, is provided with the information display area in the first state, and accordingly only information relating to the first application, such as for example the vertical application, is visible to the user via the information carrier, after performing the subsequent step the information display area of the retractable-type fall arrester is in the second state, so that only information relating to the second application, such as for example information relating to the horizontal application, is visible to the user via the information carrier. If, on the other hand, in the first step the retractable-type fall arrester is provided with the information display area in the second state, and accordingly only information relating to the second application is visible to the user via the information carrier, after performing the subsequent step the information display area of the retractable-type fall arrester is in the first state, so that only information relating to the first application is visible to the user via the information carrier. Thus, it is avoided that information relating to the first application and the second application of the personal protective equipment is visible to the user at the same time, which ensures a simple and safe use of the personal protective equipment.

According to a preferred further development of the invention, it is provided that the information carrier provides information relating to the first application on its front side and information relating to the second application on its rear side, and that the information carrier in the information display area is detachably connected to the housing or the surface of the personal protective equipment by means of a clamp connection or screw connection, and the step of changing the state of the information display area comprises rotating the information carrier about an axis of rotation which extends in a plane of the information carrier.

The change of the state is thus preferably performed by rotating the information carrier, which is preferably configured as a plate. Thus, if initially the front side of the plate is visible to the user, after rotation the back side of the plate is visible to the user and vice versa.

In this context, according to another preferred further development of the invention, it is provided that the method comprises the steps of:

- detaching the information carrier from the housing or the surface of the personal protective equipment, preferably by means of a screwdriver, and
- fastening the rotated information carrier to the housing or the surface of the personal protective equipment by clamping or screwing the information carrier to the housing or the surface.

In particular, it is thus provided that the clamping connection is released by levering the information carrier out of its clamping with the housing or the surface by means of a screwdriver, preferably by means of a slotted screwdriver or by means of another suitable tool. Preferably, after rotating the information carrier by exactly 180 degrees around the axis of rotation, which extends in the plane of the information carrier, the information carrier is again clamped to the housing or surface. For this purpose, it is particularly preferably provided that first clamping lugs of the information carrier are guided into recesses at the housing or the surface by guiding the information carrier to the housing or the surface at an angle of less than 90 degrees. After subsequent tilting of the information carrier in the direction of the housing or the surface, wherein the clamping lugs introduced into the recesses act as a joint, opposite clamping lugs of the information carrier can preferably be introduced and/or clipped into further recesses at the housing or into further recesses in the surface by temporary deforming the information carrier.

With respect to the screw connection, it is provided that the screw connection is released by means of a screwdriver or by means of another suitable tool and the information carrier is removed from the housing or the surface. Preferably, after rotating the information carrier by exactly 180 degrees about the axis of rotation, which extends in the plane of the information carrier, the information carrier is reconnected to the housing or surface by screwing. For this purpose, it is preferably provided that the information carrier comprises a screw hole corresponding to the screw and/or that the housing or the surface comprises a recess and/or depression corresponding to the screw.

According to another alternative preferred further development of the invention, it is provided that the information carrier provides on its front side information relating to the first application, preferably the vertical application, and information relating to the second application, preferably the horizontal application, and the personal protective equipment in the information display area comprises a cover comprising a viewing window for the information carrier, and the step of changing the state of the information display area comprises rotating the information carrier about an axis of rotation which extends perpendicular to a plane of the information carrier.

The change of state is thus preferably carried out by rotating the information carrier, which is preferably designed as a disc. Thus, if initially information relating to the first application is visible to the user through the viewing window of the cover, after the rotation the information relating to the second application is visible to the user and vice versa. In contrast to the first described alternative, in this alternative it is not necessary to detach the information carrier from the housing or surface of the personal protective equipment in order to change the state. This has the advantage that the information carrier cannot be lost.

In this context, according to another preferred further development of the invention it is provided, that the step of rotating the information carrier about an axis of rotation comprises turning a screw by means of a screwdriver. Preferably, by turning a screw, the information carrier configured as a disc is turned relative to the cover which is preferably fixed and preferably connected to the housing or the surface. Preferably, that screw is turned which also ensures the connection of the information carrier to the housing or the surface. Further preferably the information carrier is turned by exactly 90 degrees until the information relating to the respective other application is visible again through the viewing window for the user.

Further technical effects and advantages of the method for changing the state of the information display area of the personal protective equipment are obvious for the skilled person from the description of the personal protective equipment, as well as from the following description relating to the exemplary embodiments and the figures.

BRIEF DESCRIPTION OF THE DRAWINGS

In the following, the invention is explained in more detail with reference to the accompanying drawings by means of preferred exemplary embodiments.

In the figures.

DETAILED DESCRIPTION OF THE EXEMPLARY EMBODIMENTS

In the following, with reference to the figures, the principle of the invention is explained based on the example of a personal protective equipment designed as a retractable-type fall arrester 10. However, the personal protective equipment is not limited to retractable-type fall arresters 10, but can also be designed as a harness, a safety helmet, a connector, a descender or rescue device, a fall arrest device, a carabiner, a rescue device, a power ascender and/or a load securing system. The following description based on the example of the retractable-type fall arrester 10 will enable a person skilled in the art to understand the analogous application to other types of personal protective equipment.

Figure 1:
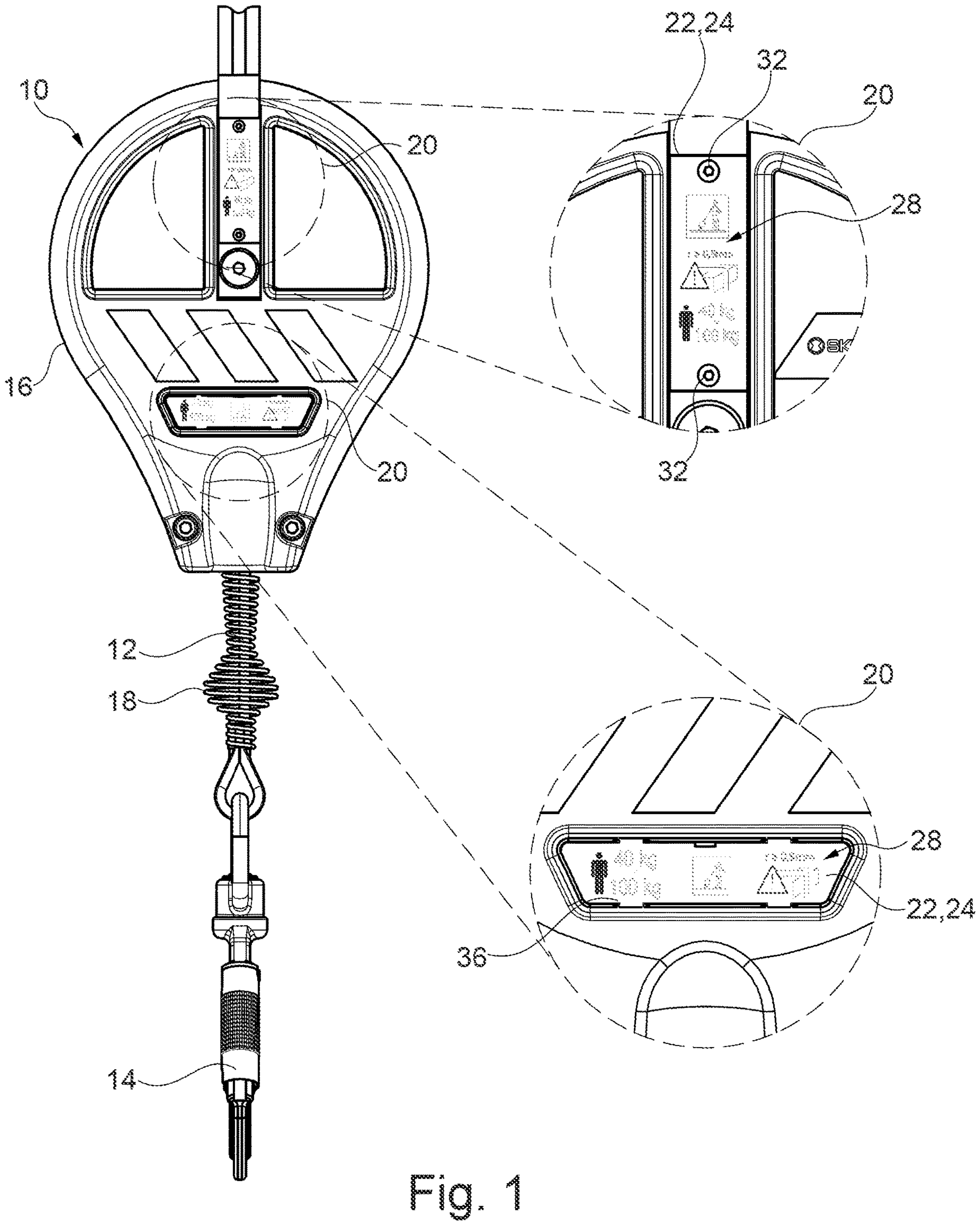
FIG. 1 shows a personal protective equipment designed as a retractable-type fall arrester, according to a first preferred exemplary embodiment of the invention.

FIG. 1 shows schematically an exemplary embodiment of a retractable-type fall arrester for vertical and horizontal use. The retractable-type fall arrester 10 is designed as a fall arrester and in this preferred exemplary embodiment comprises a connector 12 in the form of a steel rope 12 and a carabiner 14 attached thereto. In addition, the retractable-type fall arrester 10 comprises a pulley integrated in a housing 16 and a rope hoist (neither of which can be seen in the figures). In addition, an energy-absorbing pull-in damper 18 prevents the carabiner 14 from hitting the housing 16 without braking when the connector 12 is pulled in.

As shown in FIG. 1, the retractable-type fall arrester 10 further comprises an information display area 20 comprising an information carrier 22 for displaying information. The information display area 20 is configured in such a way that in a first of at least two states exclusively information relating to the first application—in this case the vertical application—is visible (in FIG. 1 the first state is not shown), and in the second state exclusively information relating to the second application—in this case the horizontal application—is visible (as shown in FIG. 1). The information display area 20 is designed in such a way that it is possible to switch back and forth between the two states a plurality of times.

Figure 2:
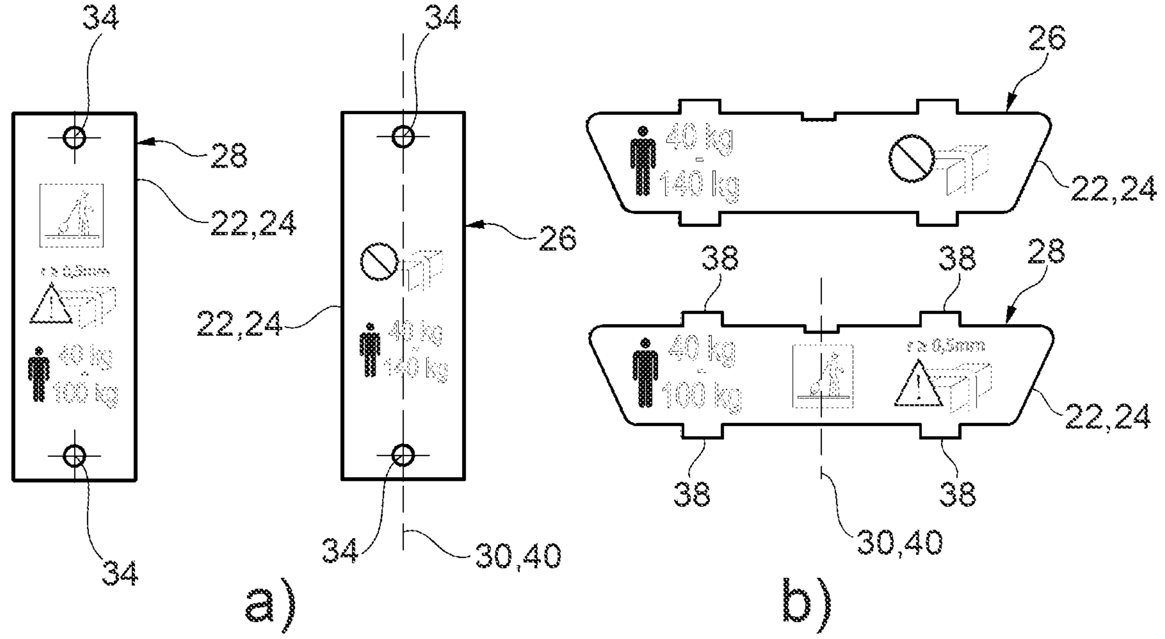
FIG. 2 shows an information carrier of the retractable-type fall arrester of FIG. 1.

In the present exemplary embodiment of FIG. 1, the retractable-type fall arrester 10 comprises two information display areas 20, each with an information carrier 22 in the form of a plate 24, wherein the information carriers still being shown in FIG. 2. The plates 24 provide information on the front side 26 relating to the vertical use and on the rear side 28 information relating to the horizontal use, in particular the maximum permissible weight with which the retractable-type fall arrester can be loaded in the specific application. It is possible to switch back and forth between the two states of the information display area 20 a plurality of times by a rotational movement of the information carrier 22 about a rotational axis 30, which extends in a plane of the information carrier 22.

In the present exemplary embodiment, one of the plates 24 is detachably connected to the housing 16 of the retractable-type fall arrester 10 by means of a screw connection 32. As can be seen in FIG. 2 *a*), this plate 24 is provided with a screw hole 34. In the present exemplary embodiment, the other plate 24 is detachably connected to the housing 16 of the retractable-type fall arrester 10 by means of a clamp connection 36. For this purpose, as can be seen in FIG. 2 *b*), this plate 24 comprises clamping lugs 38 which can engage into recesses in the housing 10. The plate 24 also has a mirror-symmetrical shape, wherein the mirror plane 40 is perpendicular to the plane of the plate 24.

Figure 3:
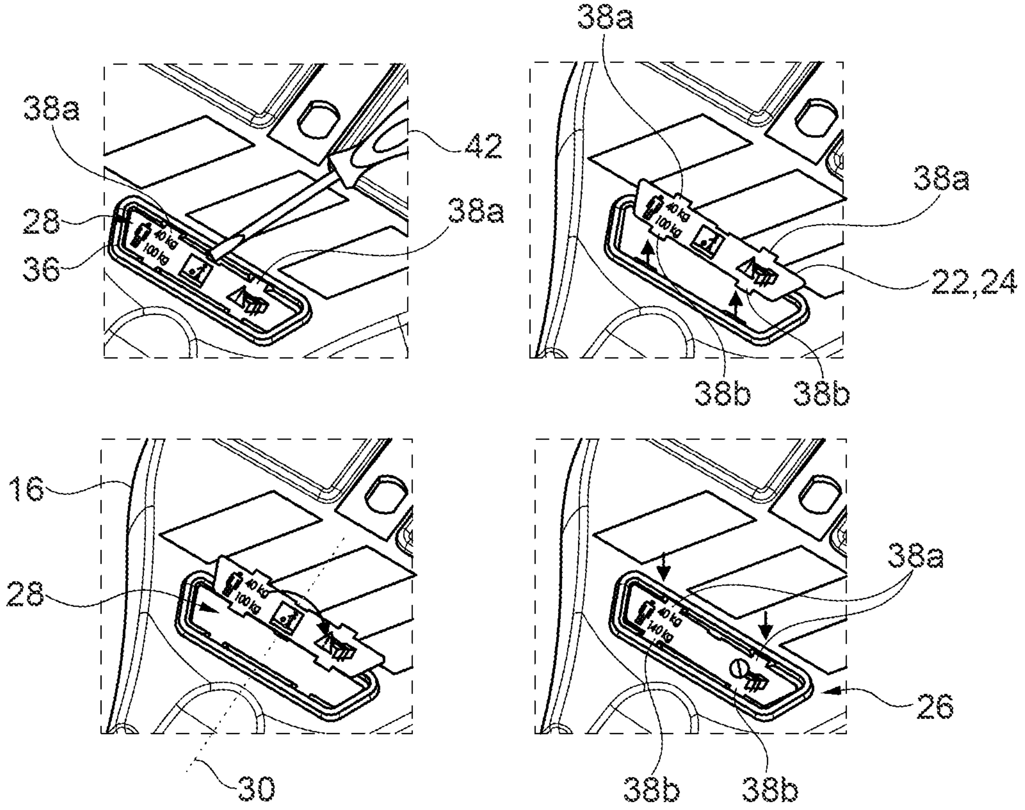
FIG. 3 shows a method for changing the state of an information display area of a personal protective equipment designed as a retractable-type fall arrester, according to a preferred exemplary embodiment of the invention.

With reference to FIG. 3, a method for changing the state of the information display area 20 of the retractable-type fall arrest device 10 is explained below. Analogous to the retractable-type fall arrester 10 shown in FIG. 1 and the information carrier 22 shown in FIG. 2*b*), the retractable-type fall arrester in FIG. 3 comprises a housing 16 and an information carrier 22 in the form of a plate 24. The information carrier 22 is detachably connected to the housing 16 by means of a clamping connection 36. In a first step of the method, the retractable-type fall arrester 10 is provided, wherein in the present case the information display area 20 is in the second state and thus exclusively provides information relating to the horizontal use.

In a further step, the information carrier 22 is detached from the housing 16 of the retractable-type fall arrester 10 by means of a screwdriver 42 by levering the information carrier 22 out of its clamping with the housing 16 in order to move the first clamping lugs 38*a* out of the recess. After the second clamping lugs 38*b* have been moved out of the recess and the information carrier 22 has been rotated exactly by 180 degrees about the axis of rotation 30, the rotated information carrier 22 is reattached to the housing 16 of the retractable-type fall arrester 10 by clamping. For this purpose, the second clamping lugs 38*b* of the information carrier 22 are first guided into recesses at the housing 16. After subsequent tilting of the information carrier 22 in the direction of the housing 16, during which the second clamping lugs 38*b* introduced into the recesses act as a joint, the opposite first clamping lugs 38*a* are clipped into the recesses on the housing 16 by temporarily deforming the information carrier 22.

Figure 4:
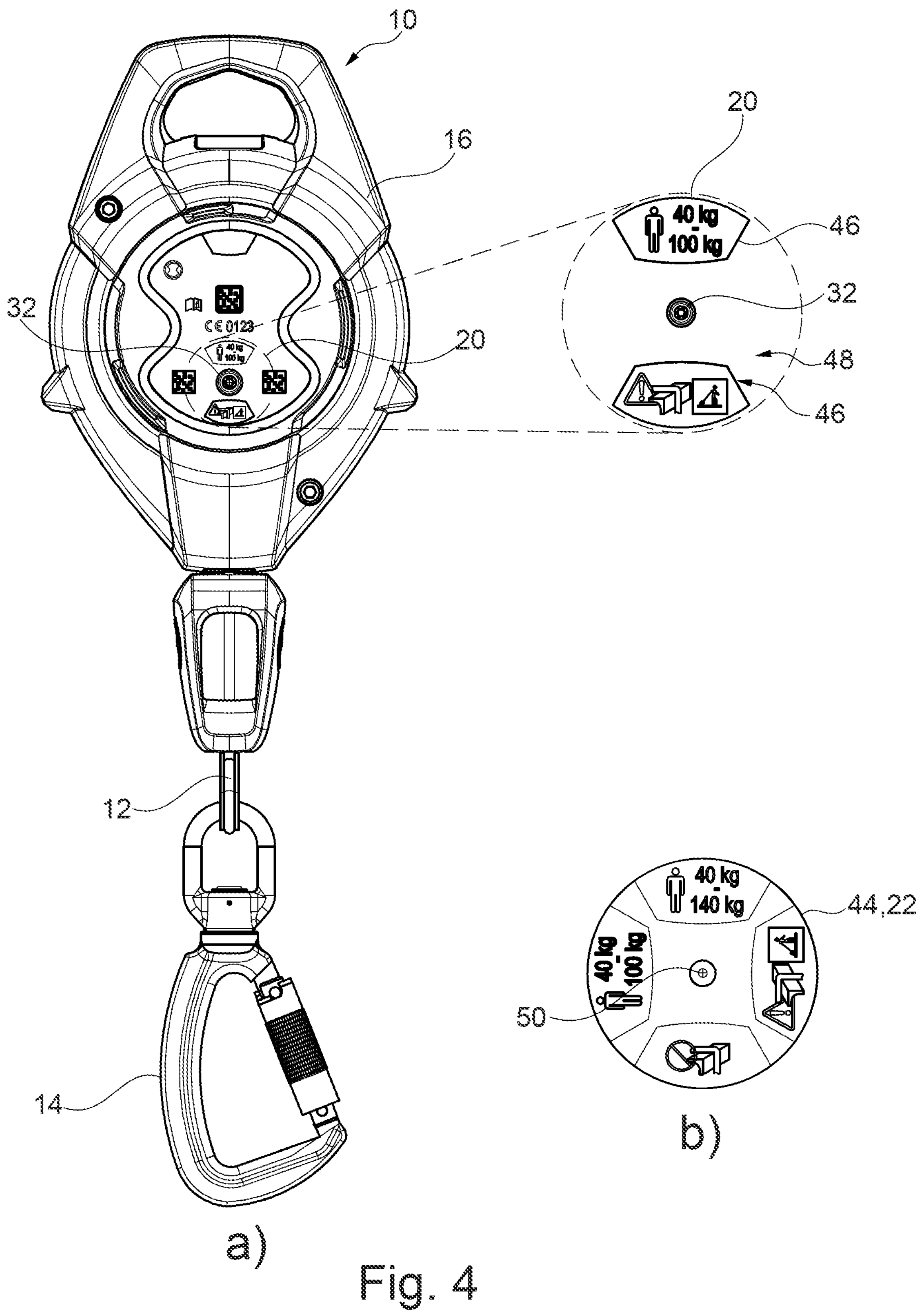
FIG. 4 shows a personal protective equipment also designed as a retractable-type fall arrester, according to another preferred exemplary embodiment of the invention.

FIG. 4 schematically shows a further exemplary embodiment of a retractable-type fall arrester 10 for vertical and horizontal use. Analogous to the retractable-type fall arrester 10 of FIG. 1, the retractable-type fall arrester 10 comprises a connector 12 in the form of a steel rope 12 and a carabiner 14 attached thereto. In addition, the retractable-type fall arrester 10 comprises a pulley integrated in the housing 16 and a rope hoist (neither of which can be seen in the figures).

The retractable-type fall arrester 10 shown in FIG. 4 comprises the information display area 20, which comprises the information carrier 22 shown in FIG. 4*b*) and designed as a disk 44 for displaying information. The information display area 20 is designed in such a way that in the first of two states only information relating to the vertical use is visible and in the second state, which is shown in FIG. 4*a*), only information relating to the horizontal use is visible.

For this purpose, the information carrier 22 provides on its front side information relating to the vertical use and information relating to the horizontal use, and the retractable-type fall arrester 10 comprises a cover 48 comprising a viewing window 46 for the information carrier 22 in the information display area 20. The cover 48 is connected to the housing 16 of the retractable-type fall arrester. The information carrier 22 is arranged between the housing 16 and the cover 48 comprising the viewing window 46. In the present case, the cover 48 comprises two viewing windows 46.

It is possible to switch back and forth between the two states of the information display area 20 a plurality of times by rotating the information carrier 22 about an axis of rotation 50 extending perpendicular to a plane of the information carrier 22. For this purpose, the information carrier 22 is connected to the housing 16 in the information display area 20 of the retractable-type fall arrester 10 in such a way that the information carrier 22 is movable relative to the cover 48. In particular, the information carrier 22 is rotatably mounted at the housing 16 via a screw connection 32 in such a way that the information carrier 22 is partially covered by the cover 48 comprising the viewing window 46. Furthermore, the size and shape of the viewing window 46 correspond to the size and shape of the information displayed on the information carrier 22. Thus, by rotating the information carrier 22 configured as a disk by 90 degrees, the state of the information display area 20 can be changed.

The described exemplary embodiments are merely examples, which may be modified and/or supplemented in a variety of ways within the scope of the claims. Any feature that has been described for a particular exemplary embodiment may be used individually or in combination with other features in any other exemplary embodiment. Any feature that has been described for an exemplary embodiment of a particular category can also be used in a corresponding manner in an exemplary embodiment of another category.

LIST OF REFERENCE SYMBOLS

10 Retractable-type fall arrester
12 Connector, steel cable
14 Carabiner
16 Housing
18 Pull-in damper
20 Information display area
22 Information carrier
24 Plate
26 Front side
28 Rear side
30 Axis of rotation extending in the plane of the information carrier
32 Screw connection
34 Screw hole
36 Clamping connection
38 Clamping lugs
40 Mirror plane
42 Screwdriver
44 Disc
46 Viewing window
48 Cover
50 Axis of rotation extending perpendicular to the plane of the information carrier

The invention claimed is:

1. Personal protective equipment comprising an information display area, wherein:

the information display area comprises an information carrier for displaying information of a first application and a second application of the personal protective equipment, the information display area displays, in a first of at least two states, exclusively information relating to the first application, and displays, in a second state, exclusively information relating to the second application, and a display of the information display area is switchable back and forth between the at least two states a plurality of times, wherein the information carrier provides information relating to the first application on a front side of the information carrier and provides information relating to the second application on a rear side of the information carrier, and/or wherein it is possible to switch back and forth between the at least two states a plurality of times by a rotational movement of the information carrier about an axis of rotation which extends in a plane of the information carrier.

2. The personal protective equipment according to claim 1, wherein the information carrier is a non-electronic information carrier, and/or wherein the information carrier is configured as a non-electronic display, and/or wherein the display of the information display area is switchable between the two states without supplying electrical energy.

3. The personal protective equipment according claim 1, wherein the information carrier is detachably connected in the information display area to a housing or a surface of the personal protective equipment by means of a clamping connection, wherein the information carrier is connected in the information display area to the housing or the surface of the personal protective equipment by means of a hinge connection, or wherein the information carrier is detachably connected in the information display area to the housing or the surface of the personal protective equipment by means of a screw connection.

4. The personal protective equipment according to claim 3, wherein the information carrier is shaped symmetrically across an axis positioned at a middle of the information carrier, wherein the information carrier comprises clamping lugs for clamping the information carrier to the housing or the surface of the personal protective equipment, and/or wherein the information carrier comprises a recess for receiving a screw connection.

5. The personal protective equipment according to claim 1, configured as a retractable fall arrester, a harness, a protective helmet, a connector, a descender or rescue device, a fall arrest device, a carabiner, a rescue device, a power ascender and/or a load securing system.

6. Method for changing a state of an information display area of a personal protective equipment, wherein the personal protective equipment comprises the information display area, the information display area comprises an information carrier for displaying information of a first application and a second application of the personal protective equipment, the information display area in a first of at least two states exclusively displays information relating to the first application and in the second state exclusively displays information relating to the second application, and a display of the information display area is switchable back and forth between the at least two states a plurality of times, comprising the steps of:

providing the personal protective equipment comprising the information display area in the first or second of the at least two states;

changing the state of the information display area by rotating or axially displacing the information carrier; or changing the state of the information display area by rotating or axially displacing a cover, which comprises a viewing window, for the information carrier, wherein the information carrier provides, on a front side of the information carrier, information relating to the first application and, on a rear side of the information carrier, information relating to the second application, and wherein the information carrier is detachably connected in the information display area to a housing or a surface of the personal protective equipment by means of a clamp connection or screw connection, and wherein the step of changing the state of the information display area comprises rotating the information carrier about an axis of rotation extending in a plane of the information carrier.

7. The method according to claim 6, comprising the steps of:

detaching the information carrier from the housing or the surface of the personal protective equipment by means of a screwdriver, and attaching the rotated information carrier to the housing or surface of the personal protective equipment by clamping or screwing the information carrier to the housing or surface.

* * * * *